United States Patent
Chien et al.

(10) Patent No.: US 11,042,216 B2
(45) Date of Patent: Jun. 22, 2021

(54) EYE-TRACKING METHOD AND DEVICE FOR REDUCING OPERATING WORKLOAD

(71) Applicant: National Taiwan University, Taipei (TW)

(72) Inventors: Shao-Yi Chien, Taipei (TW); Yu-Sheng Lin, Taipei (TW); Shih-Yi Wu, Taipei (TW)

(73) Assignee: National Taiwan University, Taipei (TW)

(*) Notice: Subject to any disclaimer, the term of this patent is extended or adjusted under 35 U.S.C. 154(b) by 37 days.

(21) Appl. No.: 16/298,985

(22) Filed: Mar. 11, 2019

(65) Prior Publication Data

US 2020/0192471 A1    Jun. 18, 2020

(30) Foreign Application Priority Data

Dec. 12, 2018 (TW) .................... 107144750

(51) Int. Cl.
- *G06K 9/00* (2006.01)
- *G06F 3/01* (2006.01)
- *G06T 7/70* (2017.01)
- *G06T 7/246* (2017.01)

(52) U.S. Cl.
CPC .............. *G06F 3/013* (2013.01); *G06T 7/248* (2017.01); *G06T 7/70* (2017.01)

(58) Field of Classification Search
CPC ............ G06F 3/013; G06T 7/248; G06T 7/70
USPC ......................................... 382/103
See application file for complete search history.

(56) References Cited

U.S. PATENT DOCUMENTS

| | | | |
|---|---|---|---|
| 9,086,582 B1* | 7/2015 | Barton | A61B 3/111 |
| 2005/0213792 A1* | 9/2005 | Hammoud | G06T 7/248 |
| | | | 382/103 |
| 2019/0303722 A1* | 10/2019 | Linden | G06K 9/0061 |

FOREIGN PATENT DOCUMENTS

WO    WO-2018035160 A1 *    2/2018    .......... H04N 5/2257

* cited by examiner

*Primary Examiner* — Stephen P Coleman
(74) *Attorney, Agent, or Firm* — Donald E. Stout; Stout, Uxa & Buyan, LLP

(57) ABSTRACT

Eye-tracking methods and devices are provided for reducing operating workload. One sub frame of an eye frame and/or a scene frame is used to estimate the eyeball position. Such an approach can reduce operating workload and power consumption.

8 Claims, 2 Drawing Sheets

EYE-TRACKING METHOD AND DEVICE FOR REDUCING OPERATING WORKLOAD

CROSS-REFERENCE TO RELATED APPLICATIONS

The entire contents of Taiwan Patent Application No. 107144750, filed on Dec. 12, 2018, from which this application claims priority, are expressly incorporated herein by reference.

BACKGROUND OF THE INVENTION

1. Field of the Invention

The present invention relates to eye-tracking methods and devices, and more particularly relates to eye-tracking methods and devices for reducing operating workload.

2. Description of Related Art

Eye-tracking is a technique for measuring an eye's movements relative to the head and eye's gazing directions. A general eye tracker includes gaze-sensing module for tracking eye's movements and gazing direction, which can be obtained by eye-tracking operation.

At present, there are various eye-tracking methods including non-invasive and invasive methods. The non-invasive methods typically obtain the eye's position by a video-capturing device. The invasive methods typically embed an eye movement measuring coil in the eye or utilize a microelectrode to record eye-tracking signals. In addition, an eye tracker generally includes a non-invasive gaze-sensing module to perform the eye-tracking, and the gaze-sensing module is typically equipped with an eye camera and a scene camera. The eye camera captures eye images of a wearer, and the scene camera captures scene images viewed by the wearer.

Because the eye tracker is placed around the eyes, the gaze-sensing module is generally required to have low power consumption, small area, and quick response.

SUMMARY OF THE INVENTION

The invention provides eye-tracking methods and devices designed for reducing the operating workload and meeting the power saving requirement. The eye-tracking method and device adopt sub-frames to reduce the operating workload, thereby reducing the power consumption.

The invention provides eye-tracking methods and devices designed for reducing the operating workload and the power consumption. The data of sub-frames can be obtained by an eye camera, a scene camera, or both, thereby reducing power consumption and saving the electricity.

According to an aspect of this invention, an eye-tracking method is provided for reducing operating workload and comprises the steps of: capturing a scene frame and a first eye frame including an eye image; performing an object detection on the first eye frame and the scene frame to obtain a first sub-frame of the first eye frame and a second sub-frame of the scene frame, respectively; and operating a data of the first sub-frame and/or a data of the second sub-frame to obtain an eyeball estimation position.

In one embodiment, the eye-tracking method further comprises: capturing a second eye frame including the eye image according to the eyeball estimation position.

In one embodiment, the data amount of the first sub-frame is less than or equal to the data amount of the first eye frame, and the data amount of the second sub-frame is less than or equal to the data amount of the scene frame.

In one embodiment, the object detection comprises using a region of interest (ROI) detection to extract the first sub-frame and/or the second sub-frame.

In one embodiment, the eyeball estimation position is estimated by applying a back projection matrix operation to the data of the first sub-frame and/or the data of the second sub-frame.

In one embodiment, the eyeball estimation position is estimated by applying an approximate operation to the data of the first sub-frame and/or the data of the second sub-frame.

In one embodiment, the first sub-frame includes the eye image.

In one embodiment, the scene frame includes a key area image and the second sub-frame includes the key area image.

According to another aspect of this invention, an eye-tracking device is provided for applying the above-mentioned eye-tracking method and comprises an eye camera that captures the first eye frame and a scene camera that captures the scene frame.

According to another aspect of this invention, an eye-tracking device is provided for applying the above-mentioned eye-tracking method and comprises an eye camera that captures the first eye frame and the second eye frame and a scene camera that captures the scene frame.

DETAILED DESCRIPTION OF THE PREFERRED EMBODIMENT

Figure 1:
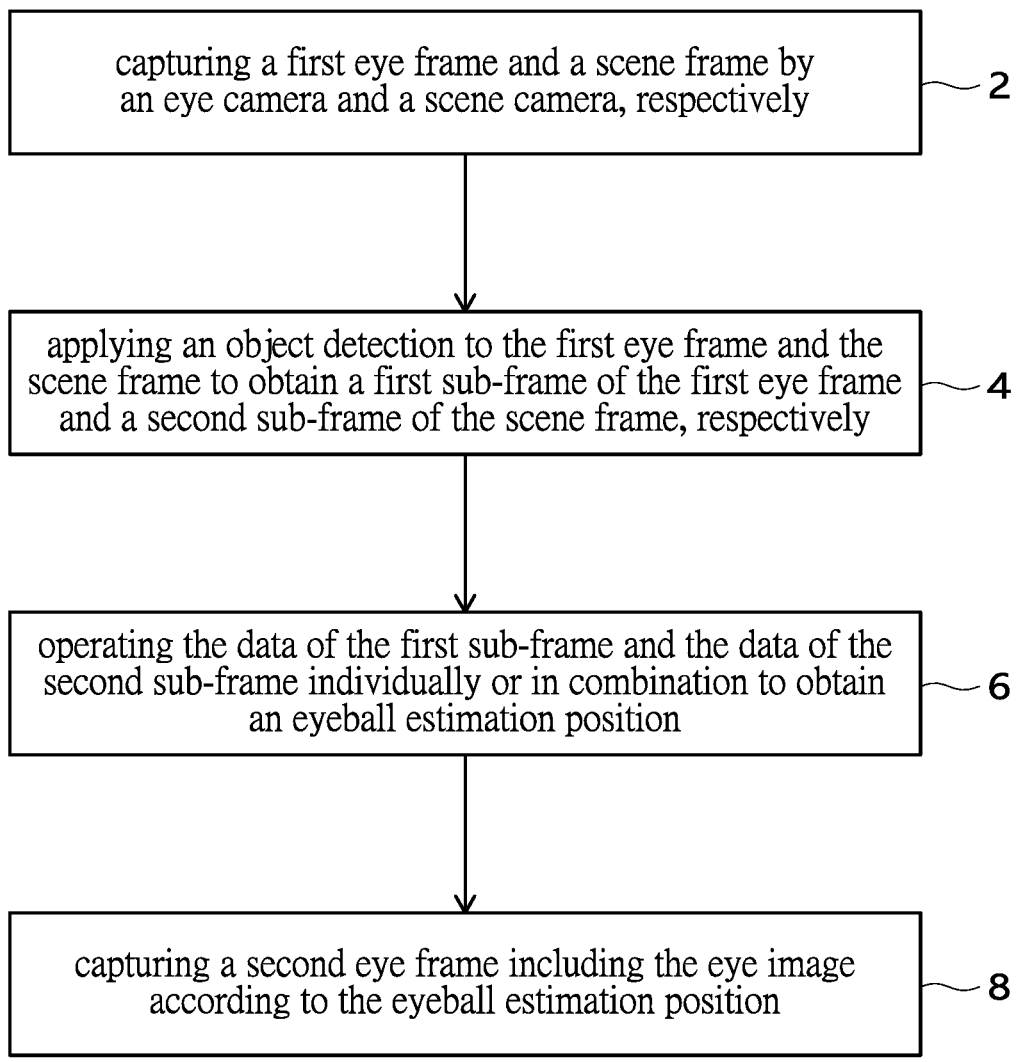
FIG. 1 is a flow chart of an eye-tracking method for reducing operating workload in accordance with an embodiment in the present invention.

Embodiments of the invention are now described and illustrated in the accompanying drawings, instances of which are to be interpreted to be to scale in some implementations while in other implementations, for each instance, not. In certain aspects, use of like or the same reference designators in the drawings and description refers to the same, similar or analogous components and/or elements, while according to other implementations the same use should not. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known process operations and components are not described in detail in order not to unnecessarily obscure the present invention. While drawings are illustrated in detail, it is appreciated that the quantity of the disclosed components may be greater or less than that disclosed, except where expressly restricting the amount of the components.

Figure 2:
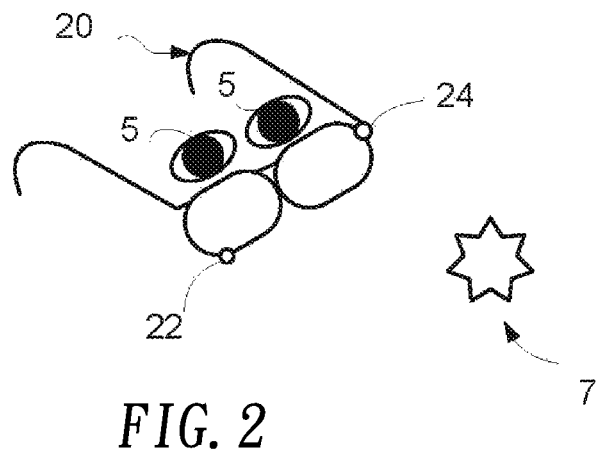
FIG. 2 is a schematic view of an eye-tracking device to which the eye-tracking method for reducing operating workload of the present application is applied.
Figure 3:
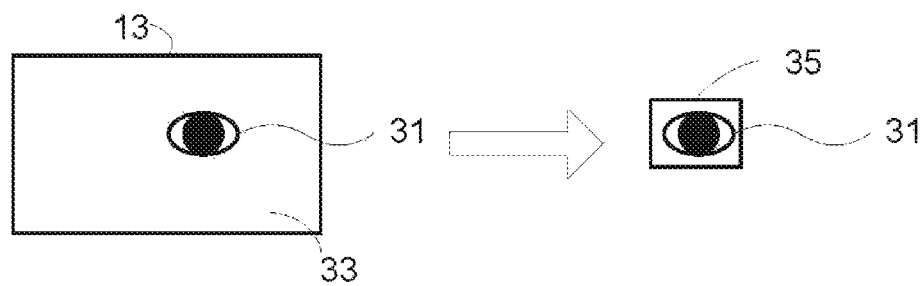
FIG. 3 is a schematic diagram showing an operation of a first eye frame of the eye-tracking device according to an embodiment of this invention.
Figure 4:
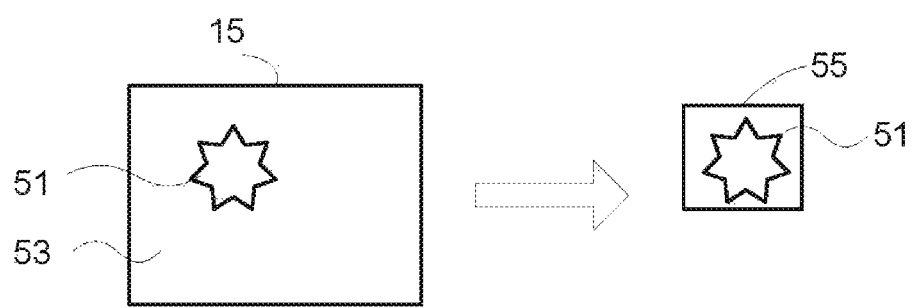
FIG. 4 is a schematic diagram showing an operation of a scene frame of the eye-tracking device according to an embodiment of this invention.
Figure 5:
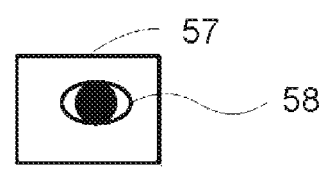
FIG. 5 is a schematic diagram of a second eye frame obtained the eye-tracking device according to an embodiment of this invention.

FIG. 1 is a flow chart of an eye-tracking method for reducing operating workload in accordance with an embodiment in the present invention. FIG. 2 is a schematic view of an eye-tracking device to which the eye-tracking method for reducing operating workload of the present application is applied. FIG. 3 is a schematic diagram showing an operation of a first eye frame of the eye-tracking device according to an embodiment of this invention. FIG. 4 is a schematic diagram showing an operation of a scene frame of the eye-tracking device according to an embodiment of this invention. FIG. 5 is a schematic diagram of a second eye frame obtained the eye-tracking device according to an embodiment of this invention. FIG. 5 is a schematic diagram of a second eye frame obtained by the embodiment of the eye tracking device. Referring to FIGS. 1-5, the eye-tracking method for reducing operating workload in the present case is performed by an eye-tracking device 20 equipped with an eye camera 22 and a scene camera 24. In step 2, firstly, the eye camera 22 and the scene camera 24 respectively capture a first eye frame 13 and a scene frame 15.

Referring to FIG. 2, generally the eye-tracking device 20 is worn in front of the wearer's eyes 5, and there is a distance between the eye camera 22 and the wearer's eyes 5. The first eye frame 13 captured by the eye camera 22 includes an eye image 31 of the wearer and a facial image 33 around the eye image 31. For the eye-tracking operation, the data of the facial image 33 in the first eye frame 13 is superfluous, and only the data of the eye image 31 is meaningful. On the other hand, the scene camera 24 captures an image of a scene 7 in front of the wearer, and the captured scene frame 15 generally includes a key area image 51 in which the wearer is interested and an irrelevant image 53 in which the wearer is relatively less interested. The position of the key area image 51 is mostly the focus of the wearer's attention. Therefore, the movements of wearer's gazing direction are closely related with the key area image 51. In contrast, the wearer is not concerned with the irrelevant image 53 and the wearer's gazing directions are less relevant to the irrelevant image 53.

Therefore, reducing the data amount of image frame will help for reducing the computation time and power consumption of the eye tracking device 20. With continued reference to FIGS. 1-5, the eye-tracking method for reducing operating workload of the present invention performs an object detection on the first eye frame 13 and the scene frame 15, respectively, thereby to obtain a first sub-frame 35 of the first eye frame 13 and a second sub-frame 55 of the scene frame 15 (step 4). In this embodiment, the data amount of the first sub-frame 35 is less than or equal to the data amount of the first eye frame 13, and the first sub-frame 35 must include the eye image 31. Second, the data amount of the second sub-frame 55 is less than or equal to the data amount of the scene frame 15, and the second sub-frame 55 must include the key area image 51. Moreover, the means for performing the object detection may include, but is not limited to, a region of interest (ROI) manner, to respectively extract the first sub-frame 35 from the first eye frame 13 and extract the second sub-frame 55 from the scene frame 15.

With continued reference to FIGS. 1-5, the data of the first sub-frame 35 and the data of the second sub-frame 55 of the present invention may be operated individually or in combination to obtain an eyeball estimation position (step 6). In the case of obtaining the eyeball estimation position by merely calculating the data of the first sub-frame 35, a two-dimensional/three-dimensional approximation operation is applied to the chopped image (the first sub-frame 35) of the previous frame (the first eye frame 13) to estimate the position of the eyeball of the current frame (the second eye frame), and where the facial image 33 of the previous frame is discarded before the approximation operation is applied. The reduction of data amount of the previous frame can reduce the operating time for estimating the eyeball position of the current frame, and also can reduce the power consumption for computation.

Secondly, in the case of obtaining the eyeball estimation position by merely calculating the data of the second sub-frame 55, the key area image 51 is usually the position that the wearer is interested in and is the position for which the wearer's eyes probably be looking. Accordingly, a back operation, such as a back-projection matrix operation, is applied to the second sub-frame 55 that includes the key area image 51, so as to estimate the wearer's eyeball position relative to the eye camera 22.

Moreover, if the eyeball estimation position is obtained by performing operations on both data of the first sub-frame 35 and the second sub-frame 55, more accurate result of the eyeball estimation position can be obtained, and the purpose of reducing power consumption of the operation is also achieved. After the eyeball estimation position is obtained, the eye camera 22 captures a second eye frame 57 to include the eye image according to the eyeball estimation position (step 8). At this time, the second eye frame 57 will have a visual field similar to that of the first sub-frame 35 and certainly includes an image 58 of the eyeball estimation position, and the data amount of the second eye frame 57 may be equal to or less than the data amount of the first eye frame 13.

Although specific embodiments have been illustrated and described, it will be appreciated by those skilled in the art that various modifications may be made without departing from the scope of the present invention, which is intended to be limited solely by the appended claims.

What is claimed is:

1. An eye-tracking method for reducing operating workload, comprising:
   capturing a scene frame and a first eye frame including an eye image;
   performing an object detection on the first eye frame and the scene frame to obtain a first sub-frame of the first eye frame and a second sub-frame of the scene frame, respectively, wherein the first sub-frame includes the eye image and is obtained by cropping the first eye frame, and the second sub-frame is obtained by cropping the scene frame; and
   operating a data of the first sub-frame and/or a data of the second sub-frame to obtain an eyeball estimation position.

2. The eye-tracking method as recited in claim 1, further comprising: capturing a second eye frame according to the eyeball estimation position, wherein the second eye frame includes the eye image and has a size smaller than the first eye frame.

3. The eye-tracking method as recited in claim 1, wherein the step of performing the object detection on the first eye frame and the scene frame comprises using a region of interest (ROI) detection to extract the first sub-frame and the second sub-frame.

4. The eye-tracking method as recited in claim 1, wherein the eyeball estimation position is estimated by applying a back projection matrix operation to the data of the first sub-frame and/or the data of the second sub-frame.

5. The eye-tracking method as recited in claim 1, wherein the eyeball estimation position is estimated by applying an approximate operation to the data of the first sub-frame and/or the data of the second sub-frame.

6. The eye-tracking method as recited in claim 1, wherein the scene frame includes a key area image and the second sub-frame includes the key area image.

7. An eye-tracking device for applying the eye-tracking method for reducing operating workload according to claim 1, comprising an eye camera that captures the first eye frame and a scene camera that captures the scene frame.

8. An eye-tracking device for applying the eye-tracking method for reducing operating workload according to claim 2, comprising an eye camera that captures the first eye frame and the second eye frame and a scene camera that captures the scene frame.

* * * * *